April 2, 1940.　　W. C. SHORT ET AL　　2,195,432
VEHICLE
Filed Jan. 23, 1939　　2 Sheets-Sheet 1
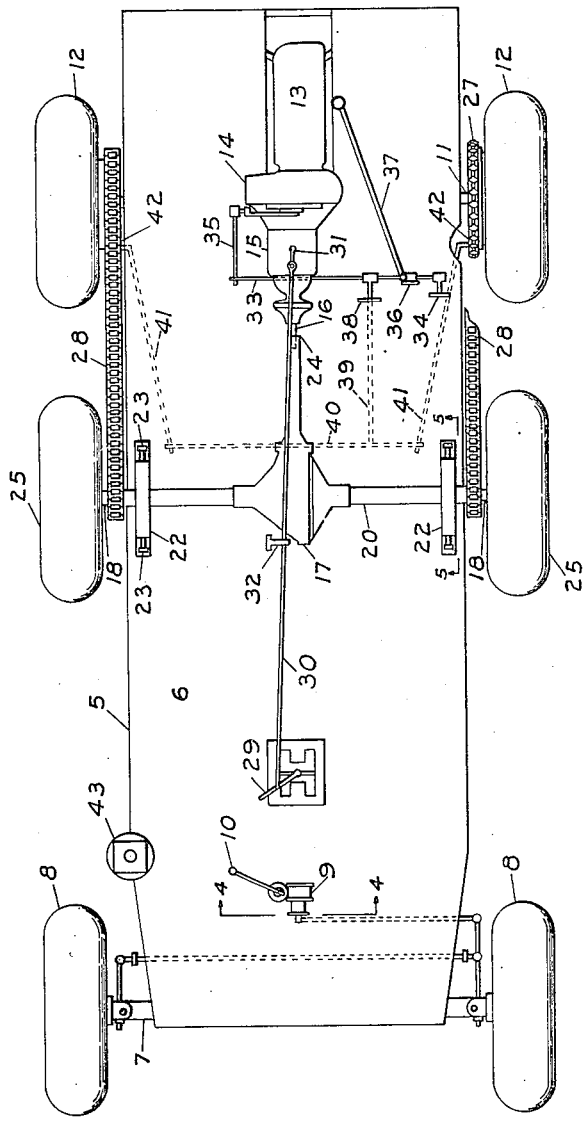
Fig-1-
Inventors
Walter C. Short, Robert G. Howie
Melvin C. Wiley
By Kessenich & J H Church
Attorneys April 2, 1940.  W. C. SHORT ET AL  2,195,432
VEHICLE
Filed Jan. 23, 1939   2 Sheets-Sheet 2
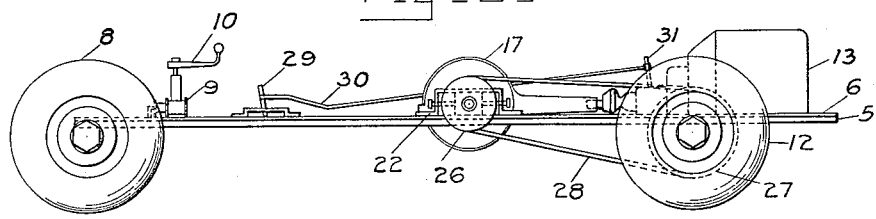
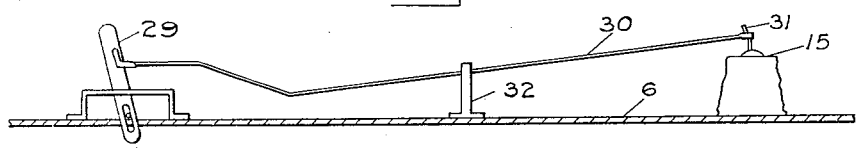
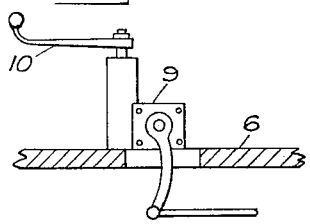
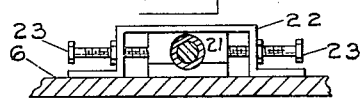
Inventors
Walter C. Short, Robert G. Howie
Melvin C. Wiley
By  Kessenich & J. H. Church
Attorneys Patented Apr. 2, 1940

2,195,432

UNITED STATES PATENT OFFICE 2,195,432

VEHICLE

Walter C. Short, Fort Hamilton, N. Y., and Robert G. Howie and Melvin C. Wiley, Fort Benning, Ga.

Application January 23, 1939, Serial No. 252,412

3 Claims. (Cl. 180—22)

(Granted under the act of March 3, 1883, as amended April 30, 1928; 370 O. G. 757)

The invention described herein may be manufactured and used by or for the Government for governmental purposes, without the payment to us of any royalty thereon.

The subject of this invention is a vehicle.

The purpose of the invention is to provide a vehicle of low weight and height, capable of being lifted into a truck and across small obstacles and presenting reduced visibility and vulnerability when operated as a self-propelled unit for military purposes.

In addition to meeting these requirements it is intended to facilitate rapid production in time of emergency and it is therefore proposed to utilize elements of standard commercial automotive vehicles and adapt them for use by rearrangement and a minimum of modification.

The vehicle is characterized by a provision whereby the operator occupies a prone position from which he controls the power plant which is located in the rear.

The specific nature of the invention as well as other objects and advantages thereof will clearly appear from a description of a preferred embodiment as shown in the accompanying drawings in which:

Fig. 1 is a plan view of a vehicle constructed in accordance with the invention;

Fig. 2 is a view in side elevation, the intermediate wheels being omitted;

Fig. 3 is a detail view in side elevation of the gear shift mechanism;

Figs. 4 and 5 are sectional views taken on the corresponding lines of Fig. 1.

Referring to the drawings by characters of reference the vehicle comprises a frame 5 to which is secured a platform 6. A front axle 7 secured to the frame includes wheels 8—8 adapted for steering through control mechanism 9 mounted on the platform in a position to be actuated by an operator in a prone position. The control mechanism is of a commercial type and is adapted for use with slight modification including the substitution of a crank 10 for a steering wheel. A rear axle 11 fixed to the frame adjacent its rear end carries rear driving wheels 12—12.

A power plant 13 with associated clutch 14, transmission 15, shortened propeller shaft 16, differential 17 and driving axles 18—18 all of a standard type, are mounted on the rear part of the platform and frame and the assembly is reversed with respect to its normal position in an automobile.

The power plant 13 is generally in rear of the rear axle 11, while the driving axles 18 are substantially at the center of the platform and are within the usual axle housing 20. The opposite ends of the housing 20 are each mounted in a block 21 which is held onto the platform by a bracket 22 and is capable of being displaced longitudinally of the platform and held in adjusted position by a pair of screws 23—23 mounted in the bracket. To allow for this displacement the propeller shaft includes a slip joint 24. Because of the reversal of the power plant assembly the differential and driving axles are reversed to provide for reversal in drive at one speed and for forward drive at several speeds.

The driving axles 18 extend laterally beyond the frame and each axle may carry a wheel 25 either driven or floated. The outer end of each axle 18 carries a sprocket 26 which with a larger sprocket 27 on the rear wheel 12 receives a chain 28 and provides a gear reduction. The sprockets and chain are standard parts of a commercial motorcycle.

The gear shift lever 29 mounted in the front part of the platform and directly in rear of the steering control 9 is connected by a link 30 to the standard gear shift lever 31 of the power unit. The link is pivotally supported intermediate its ends in an upright support 32.

A shaft 33 mounted transversely of the platform in the vicinity of the feet of an operator lying prone on the platform is rocked by a clutch pedal 34 and through linkage 35 is arranged to actuate the clutch. An accelerator pedal 36 mounted on the shaft adjacent the pedal 34 is connected by linkage 37 to the carburetor. A brake pedal 38 also mounted on the shaft is connected by a forwardly extending link 39 to an equalizing bar 40 which is positioned in rear of the axle housing and is connected by rods 41—41 to brakes 42, one on each of the rear wheels. The brakes comprise standard motorcycle brake drum assemblies.

A gun mount generally indicated at 43 is secured to the platform and frame in a position whereby a gun may be operated by a gunner in prone position.

We claim:

1. A vehicle comprising a frame, a platform on the frame, a front axle fixed to the frame and including steering wheels, a rear axle fixed to the frame and including rear driving wheels, a power plant with associated transmission on the rear of the platform, a forwardly extending propeller shaft, a differential and driving axles assembly extending transversely of the platform near its center, wheels on the driving axles, a sprocket on each driving axle, a chain drive from each sprocket to a rear wheel, and means for controlling the power plant by an operator in a prone position on the platform.

2. A vehicle comprising a frame, a platform on the frame, a front axle fixed to the frame and including steering wheels, a rear axle fixed to the frame and including rear driving wheels, a power plant with associated transmission on the rear of the platform, a forwardly extending propeller shaft, a differential and driving axles assembly extending transversely of the platform near its center, a sprocket on each driving axle, a chain drive from each sprocket to a rear wheel, and means for controlling the power plant by an operator in a prone position on the platform.

3. A vehicle comprising a wheeled platform, an assembly of power unit, transmission, differential and driving axles arranged on the platform with the power unit at the rear of the platform and the driving axles near the center of the platform, a transmission control actuatable from the front end of the platform by an operator in a prone position, and power unit controls at the rear of the platform and arranged for actuation by the feet of an operator in a prone position.

WALTER C. SHORT.
ROBERT G. HOWIE.
MELVIN C. WILEY.